(12) United States Patent
Nishizawa

(10) Patent No.: US 10,949,489 B2
(45) Date of Patent: Mar. 16, 2021

(54) SERVER, METHOD, AND STORAGE MEDIUM FOR SEARCHING AND DISPLAYING RESULTS

(71) Applicant: Gurunavi, Inc., Chiyoda-ku (JP)

(72) Inventor: Kiyoshi Nishizawa, Chiyoda-ku (JP)

(73) Assignee: Gurunavi, Inc., Chiyoda-ku (JP)

(*) Notice: Subject to any disclaimer, the term of this patent is extended or adjusted under 35 U.S.C. 154(b) by 114 days.

(21) Appl. No.: 16/329,067

(22) PCT Filed: Oct. 20, 2016

(86) PCT No.: PCT/JP2016/081184
§ 371 (c)(1),
(2) Date: Feb. 27, 2019

(87) PCT Pub. No.: WO2018/042683
PCT Pub. Date: Mar. 8, 2018

(65) Prior Publication Data
US 2019/0197078 A1   Jun. 27, 2019

(30) Foreign Application Priority Data

Aug. 31, 2016  (JP) .............................. JP2016-170406

(51) Int. Cl.
*G06F 3/0482*   (2013.01)
*G06F 16/957*   (2019.01)
(Continued)

(52) U.S. Cl.
CPC ........ *G06F 16/9577* (2019.01); *G06F 3/0482* (2013.01); *G06F 3/04812* (2013.01);
(Continued)

(58) Field of Classification Search
CPC .... G06F 3/0482; G06F 16/248; G06F 16/532; G06F 16/9537; G06F 3/04842;
(Continued)

(56) References Cited

U.S. PATENT DOCUMENTS 5,778,382 A * 7/1998 Hatori ................ G06F 16/9038
2005/0080764 A1 4/2005 Ito
(Continued)

FOREIGN PATENT DOCUMENTS

JP      9-6791 A    1/1997
JP    11-203303 A   7/1999
(Continued)

OTHER PUBLICATIONS

Japanese Office Action dated Apr. 18, 2019 in Japanese Patent Application No. 2018-536881 (with unedited computer generated English translation), 7 pages.

(Continued)

*Primary Examiner* — Phuong H Nguyen
(74) *Attorney, Agent, or Firm* — Oblon, McClelland, Maier & Neustadt, L.L.P.

(57) ABSTRACT

The invention makes it possible to provide appropriate information that is highly visible to a user. A server is a server that provides information to a terminal device and includes: a storage section that stores a plurality of pieces of display information associated with search conditions and also stores a first search condition and a second search condition in association with each other; an identification section that identifies any of the search conditions and, if the identified search condition is the first search condition, identifies the display information associated with the first search condition, with a first predetermined number as an upper limit, and identifies the display information associated with the second search condition, with a second predetermined number as an upper limit; and a transmission section that transmits the identified display information to the terminal device.

18 Claims, 10 Drawing Sheets

(51) Int. Cl.
  *G06Q 50/12* (2012.01)
  *G06Q 30/06* (2012.01)
  *G06F 16/9538* (2019.01)
  *G06F 3/0481* (2013.01)

(52) U.S. Cl.
  CPC ......... *G06F 16/9538* (2019.01); *G06Q 30/06* (2013.01); *G06Q 50/12* (2013.01)

(58) Field of Classification Search
  CPC .. G06F 16/9535; G06F 3/0484; G06F 16/245; G06F 16/2474; G06F 16/438; G06F 16/48; G06F 16/90328; G06F 16/9538; G06F 16/148; G06F 16/2423; G06F 16/334; G06F 16/338; G06F 16/43; G06F 16/435; G06F 16/9536; G06F 3/00; G06F 3/04812; G06F 3/1462; G06F 40/103; G06F 9/453; G06F 16/9577; G06Q 50/12; G06Q 30/06
  See application file for complete search history.

(56) References Cited

U.S. PATENT DOCUMENTS

| | | | |
|---|---|---|---|
| 2014/0074822 A1* | 3/2014 | Lee | G06F 16/248 707/722 |
| 2015/0213536 A1* | 7/2015 | Liu | G06F 16/2291 705/26.62 |
| 2015/0347532 A1* | 12/2015 | Shaw | G06F 3/0484 707/722 |
| 2017/0287041 A1 | 10/2017 | Kim | |

FOREIGN PATENT DOCUMENTS

| | | |
|---|---|---|
| JP | 2002-312428 A | 10/2002 |
| JP | 2005-122321 A | 5/2005 |
| JP | 2006-18843 A | 1/2006 |
| JP | 2009-116424 A | 5/2009 |
| JP | 5852768 B1 | 2/2016 |
| JP | 5891339 B1 | 3/2016 |
| JP | 2016-131046 A | 7/2016 |
| WO | WO 2008/041317 A1 | 4/2006 |

OTHER PUBLICATIONS

International Search Report dated Jan. 17, 2017 in PCT/JP2016/081184 filed Oct. 20, 2016.

Japanese Office Action dated Sep. 8, 2020 in Patent Application No. 2019-145758 (with English translation), 16 pages.

* cited by examiner

FIG. 6

| SEARCH CONDITION ID | SEARCH CONDITION CONTENT | RELATED SEARCH CONDITION ID | SEARCH PRIORITY | ... |
|---|---|---|---|---|
| KS00001 | USABLE FOR DATING | KS00001 | 1 | ... |
| | | KS00003 | 2 | ... |
| | | KS00005 | 3 | ... |
| | | KS00006 | 4 | ... |
| | | ⋮ | ⋮ | ... |
| KS00002 | SUITABLE FOR GIRLS' PARTY | KS00002 | 4 | ... |
| | | KS00003 | 2 | ... |
| | | KS00004 | 3 | ... |
| | | KS00009 | 1 | ... |
| | | ⋮ | ⋮ | ... |
| KS00003 | STYLISH ATMOSPHERE | ⋮ | ⋮ | ... |
| KS00004 | GOOD VIEW | ⋮ | ⋮ | ... |
| KS00005 | CAN SEE NIGHT VIEW | ⋮ | ⋮ | ... |
| KS00006 | RELAXING ATMOSPHERE | ⋮ | ⋮ | ... |
| ⋮ | ⋮ | ⋮ | ⋮ | ... |
| KS00021 | ITALIAN | — | ⋮ | ... |
| ⋮ | ⋮ | ⋮ | ⋮ | ... |

FIG. 7

| SHOP ID | SHOP NAME | SEARCH CONDITION | IMAGE (IMAGE INFORMATION, SEARCH CONDITION) | ADDRESS | NEAREST STATION | ... |
|---|---|---|---|---|---|---|
| R0000001 | RESTAURANT A | (KS00001, KS00002, KS00004, KS00005, ...) | (R0000001-Img001.jpg, KS00001), (R0000001-Img002.jpg, KS00004), ... | CHIYODA-KU, TOKYO ... | UCHISAIWAI-CHO | ... |
| R0000002 | RESTAURANT B | (KS00002, KS00003, KS00005, KS00006, ...) | (R0000002-Img001.jpg, KS00002), (R0000002-Img002.jpg, KS00006), ... | MINATO-KU, TOKYO ... | TAMEIKE-SANNO | ... |
| ... | ... | ... | ... | ... | ... | ... |

SERVER, METHOD, AND STORAGE MEDIUM FOR SEARCHING AND DISPLAYING RESULTS

TECHNICAL FIELD

The invention relates to a server, an information provision method, and an information provision program.

BACKGROUND ART

Conventionally, an information provision system is known, in which information is provided to a terminal device such as a mobile phone via a communication network. In such an information provision system, a server that receives a search condition sent from a terminal device can provide information according to the search condition to the terminal device.

For example, Patent Literature 1 describes an automatic reservation system in which a list of shop information is sent to a mobile terminal based on reservation information (condition information) sent from the mobile terminal. In the automatic reservation system, the reservation information sent from the mobile terminal includes usage information according to a purpose of usage, cuisine genre information, and the like. A user can acquire a list of shops matching the desired purpose of usage or cuisine genre from the automatic reservation system by sending the usage information, the genre information, or the like as the reservation information to the automatic reservation system.

CITATION LIST

Patent Literature

[Patent Literature 1] Japanese Patent Application Publication No. 2009-116424

SUMMARY OF INVENTION

However, in conventional information provision systems, if a plurality of search conditions are sent from a terminal device, the same information is retrieved in an overlapping manner based on each of the plurality of search conditions in some cases. In such cases, for example, if the retrieved information is displayed in the form of a list, the same information is consecutively displayed sometimes.

If the same information is retrieved in an overlapping manner based on each of a plurality of search conditions as described above, information that is highly visible to a user cannot be provided by some conventional information provision systems.

The invention has been made to solve such a problem, and makes it possible to provide a server, an information provision method, and an information provision program that can provide appropriate information that is highly visible to a user.

There is provided a server which is a server that provides information to a terminal device, including: a storage section that stores a plurality of pieces of display information associated with search conditions; an identification section that identifies any of the search conditions and identifies the display information associated with the identified search condition; and a transmission section that transmits display data for displaying a screen containing the identified display information to the terminal device, wherein if the identification section identifies a first search condition and a second search condition, the identification section identifies the display information associated with the first search condition and the display information associated with the second search condition, and if the display information associated with the first search condition and the display information associated with the second search condition include overlapping display information, the transmission section transmits the display data for displaying the screen in which the overlapping display information is placed apart from each other at a predetermined distance.

In the server, the screen preferably includes a display area that displays the display information associated with the first search condition and a display area that displays the display information associated with the second search condition.

In the server, the identification section preferably sets the predetermined distance to be longer as the display area that displays the display information associated with the first search condition and the display area that displays the display information associated with the second search condition match each other to a higher degree of matching.

In the server, the identification section preferably sets the predetermined distance to be longer as individual display information included in each of the overlapping display information matches each other to a higher degree of matching.

In the server, if the identification section identifies three or more search conditions, the identification section identifies the display information associated with each of the three or more search conditions, and if the respective display information associated with the three or more search conditions include overlapping display information, the transmission section preferably transmits the display data for displaying the screen in which the overlapping display information is placed within a scope not exceeding an upper-limit number of overlaps.

In the server, the identification section preferably sets the predetermined distance, depending on the size of a display area containing the identified display information.

In the server, the identification section preferably sets the predetermined distance to be shorter as the size of the display area containing the identified display information is larger.

There is provided a server which is a server that provides information to a terminal device, including: a storage section that stores a plurality of pieces of display information associated with search conditions; an identification section that identifies any of the search conditions and identifies the display information associated with the identified search condition; and a transmission section that transmits display data for displaying a screen containing the identified display information to the terminal device, wherein if the identification section identifies a first search condition and a second search condition, the identification section identifies the display information associated with the first search condition and the display information associated with the second search condition, and if the display information associated with the first search condition and the display information associated with the second search condition include overlapping display information, the transmission section transmits the display data for displaying the screen containing the display information in which respective display forms of the overlapping display information are made so as to be different from each other.

In the server, preferably, the respective display forms of the overlapping display information are made so as to be different from each other in such a manner that part or all of individual display information included in each of the overlapping display information is set to be different from each other.

In the server, with respect to individual display information included in the display information, the storage section preferably stores the individual display information associated with the first search condition and the individual display information associated with the second search condition, and, preferably, the respective display forms of the overlapping display information are made so as to be different from each other in such a manner that the display information, of the overlapping display information, identified based on the first search condition is configured to include the individual display information associated with the first search condition, and the display information, of the overlapping display information, identified based on the second search condition is configured to include the individual display information associated with the second search condition.

In the server, preferably, the respective display forms of the overlapping display information are made so as to be different from each other in such a manner that the information amount of the individual display information included in each of the overlapping display information is set to be different from each other.

In the server, preferably, the individual display information is shop image information and/or shop explanation text.

In the server, with respect to the overlapping display information, if a degree of matching between the individual display information associated with the first search condition included in the display information identified based on the first search condition and the individual display information associated with the second search condition included in the display information identified based on the second search condition is equal to or higher than a predetermined value, the transmission section preferably transmits the display data for displaying the screen in which the overlapping display information is placed apart from each other at a predetermined distance.

In the server, the screen preferably includes a display area that displays the display information associated with the first search condition and a display area that displays the display information associated with the second search condition, and, preferably, the respective display forms of the overlapping display information are made so as to be different from each other in such a manner that a plurality of the display areas containing the overlapping display information, respectively, are set to be different from each other in at least one of shape, size, display color, and amount of a display content.

In the server, preferably, in the screen, control is performed so that different smells or sounds are generated when the overlapping display information is displayed or operated.

There is provided an information provision method which is an information provision method to be performed by a computer that includes a storage section and provides information to a terminal device, including: storing a plurality of pieces of display information associated with search conditions in the storage section; identifying any of the search conditions; identifying the display information associated with the identified search condition; and transmitting display data for displaying a screen containing the identified display information to the terminal device, wherein if a first search condition and a second search condition are identified in the identifying any of the search conditions, the display information associated with the first search condition and the display information associated with the second search condition are identified in the identifying the display information, and in the transmitting display data, if the display information associated with the first search condition and the display information associated with the second search condition include overlapping display information, the display data for displaying the screen in which the overlapping display information is placed apart from each other at a predetermined distance is transmitted.

There is provided an information provision method which is an information provision method to be performed by a computer that includes a storage section and provides information to a terminal device, including: storing a plurality of pieces of display information associated with search conditions in the storage section; identifying any of the search conditions; identifying the display information associated with the identified search condition; and transmitting display data for displaying a screen containing the identified display information to the terminal device, wherein if a first search condition and a second search condition are identified in the identifying any of the search conditions, the display information associated with the first search condition and the display information associated with the second search condition are identified in the identifying the display information, and in the transmitting display data, if the display information associated with the first search condition and the display information associated with the second search condition include overlapping display information, the display data for displaying the screen containing the display information in which respective display forms of the overlapping display information are made so as to be different from each other is transmitted.

There is provided an information provision program which is an information provision program of a server that includes a storage section and provides information to a terminal device, causing the server to perform: storing a plurality of pieces of display information associated with search conditions in the storage section; identifying any of the search conditions; identifying the display information associated with the identified search condition; and transmitting display data for displaying a screen containing the identified display information to the terminal device, wherein if a first search condition and a second search condition are identified in the identifying any of the search conditions, the display information associated with the first search condition and the display information associated with the second search condition are identified in the identifying the display information, and in the transmitting display data, if the display information associated with the first search condition and the display information associated with the second search condition include overlapping display information, the display data for displaying the screen in which the overlapping display information is placed apart from each other at a predetermined distance is transmitted.

There is provided an information provision program which is an information provision program of a server that includes a storage section and provides information to a terminal device, causing the server to perform: storing a plurality of pieces of display information associated with search conditions in the storage section; identifying any of the search conditions; identifying the display information associated with the identified search condition; and transmitting display data for displaying a screen containing the identified display information to the terminal device, wherein if a first search condition and a second search condition are identified in the identifying any of the search conditions, the display information associated with the first search condition and the display information associated with the second search condition are identified in the identifying the display information, and in the transmitting display data, if the display information associated with the first search condition and the display information associated with the second search condition include overlapping display information, the display data for displaying the screen containing the display information in which respective display forms of the overlapping display information are made so as to be different from each other is transmitted.

Advantageous Effects of Invention

According to the server, the information provision method, and the information provision program, it is possible to provide appropriate information that is highly visible to a user.

BRIEF DESCRIPTION OF DRAWINGS

FIG. 6 shows an example of a data structure of a search condition table.

FIG. 7 shows an example of a data structure of a shop information table.

DESCRIPTION OF EMBODIMENTS

Hereinafter, various embodiments of the invention will be described with reference to the drawings. However, it should be noted that the technical scope of the invention is not limited to the embodiments and covers the inventions according to claims and equivalents.

An information provision system 1 includes a terminal device 2 that transmits a search condition for searching for shop information, and a server 3 that receives the search condition transmitted from the terminal device 2, identifies shop information associated with the received search condition, and transmits the identified shop information to the terminal device 2. The shop information includes a shop name, a shop address, a shop telephone number, shop image information, shop explanation text, and the like related to a shop such as an eating/drinking place. Note that the shop image information includes a shot image obtained by shooting the interior of the shop or a conceptual image of the interior of the shop, a picked up image or a conceptual image of a cuisine, a service, or the like provided by the shop, and the like. Note that the image information may include any of a still image and a moving picture. Note that the shop information is an example of display information or provided information.

The search condition is text information such as a key word or a sentence for searching for the shop information.

For example, the search condition is a genre of a cuisine or a service, a price range of a cuisine or a service, subjective or objective information about a shop (for example, "good atmosphere", "good view", or the like), area information about the location of a shop (for example, "Shimbashi, Yurakucho" or the like), or the like. A user who operates the terminal device 2 sends text information as a search condition, which is entered using a free word or free words in a text box displayed on the terminal device 2, to the server 3. Note that the search condition may be an item selected and entered by the user from among items related to a plurality of search conditions displayed on the terminal device 2. The terminal device 2 is, for example, a multi-functional mobile phone called "smartphone", a mobile phone called "feature phone", or the like. However, the terminal device 2 may be any communication device that has a function of communicating with the server 3, a function of displaying information, and the like.

Figure 1:
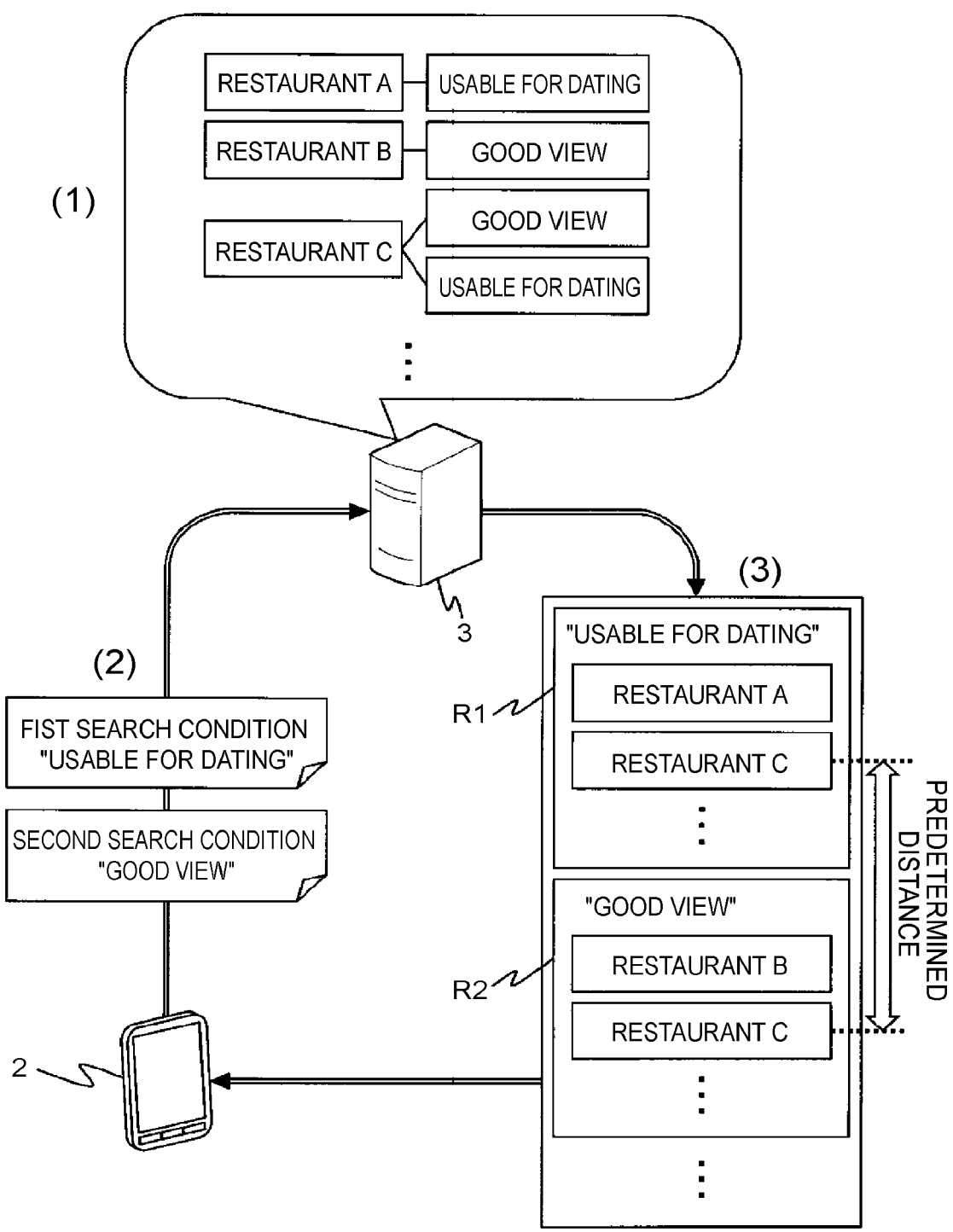
FIG. 1 is a diagram for describing an outline of an information provision system 1.

In the following, FIG. 1 is a diagram for describing an outline of the information provision system 1. Hereinafter, a search function of the information provision system 1 will be described with reference to FIG. 1.

First, the server 3 stores a plurality of pieces of shop information associated with search conditions. In an example shown at (1) in FIG. 1, both shop information on "restaurant A" and shop information on "restaurant C" are stored in association with a search condition "usable for dating". Moreover, both shop information on "restaurant B" and the shop information on "restaurant C" are stored in association with a search condition "good view".

Among a plurality of the search conditions, the server 3 stores predetermined search conditions and related search conditions in association with each other. For example, the search condition "good view", a search condition "can see night view", and the like are associated with the search condition "usable for dating" and stored as related search conditions.

The terminal device 2 transmits a search condition entered by a user to the server 3 in response to a search instruction from the user, and the server 3 receives the search condition transmitted from the terminal device 2. In an example shown at (2) in FIG. 1, a first search condition "usable for dating" and a second search condition "good view" are entered by the user on the terminal device 2, and the entered search conditions are transmitted to the server 3.

The server 3 identifies shop information associated with the received first search condition. In the example shown at (1) in FIG. 1, the shop information on "restaurant A" and the shop information on "restaurant C" are associated with the search condition "usable for dating". The server 3 therefore identifies the shop information on "restaurant A" and the shop information on "restaurant C" associated with the search condition "usable for dating". Note that shop information associated with the first search condition may be identified, with a preset first predetermined number as an upper limit. The first predetermined number is a number smaller than an upper-limit number of pieces of shop information that can be identified in one search. Note that the upper-limit number of pieces of shop information that can be identified in one search is an example of a third predetermined number.

Next, the server 3 identifies shop information associated with the received second search condition. In the example shown at (1) in FIG. 1, the shop information on "restaurant B" and the shop information on "restaurant C" are associated with the second search condition "good view". The server 3 therefore identifies the shop information on "restaurant B" and the shop information on "restaurant C" associated with the second search condition "good view". Note that shop information associated with the second search condition may be identified, with a preset second predetermined number as an upper limit. The second predetermined number is a number smaller than the third predetermined number. Note that the sum of the first predetermined number and the second predetermined number is set to be equal to or smaller than the third predetermined number. Note that the second predetermined number is a number smaller than the first predetermined number, but may be a number corresponding to the difference between the third predetermined number and the first predetermined number.

The server 3 then transmits the identified shop information to the terminal device 2 that has transmitted the search condition. In an example shown at (3) in FIG. 1, the shop information transmitted to the terminal device 2 includes the shop information on "restaurant A" and the shop information on "restaurant C" associated with the first search condition "usable for dating". Further, the shop information transmitted to the terminal device 2 includes the shop information on "restaurant B" and the shop information on "restaurant C" associated with the second search condition "good view".

Note that each shop information transmitted to the terminal device 2 is contained in a display area R that is set for each search condition used in processing of identifying each shop information. In the example shown at (3) in FIG. 1, the shop information on "restaurant A" and the shop information on "restaurant C" are displayed within a display area R1 corresponding to the first search condition "usable for dating". The shop information on "restaurant B" and the shop information on "restaurant C" are displayed within a display area R2 corresponding to the second search condition "good view".

If the shop information associated with the first search condition and the shop information associated with the second search condition include overlapping shop information, the server 3 places the overlapping shop information apart from each other at a predetermined distance. For example, in the example shown at (3) in FIG. 1, the shop information on "restaurant C" associated with the first search condition "usable for dating" and the shop information on "restaurant C" associated with the second search condition "good view" are placed apart from each other at the predetermined distance.

As described above, in the information provision system 1, if the shop information associated with the first search condition and the shop information associated with the second search condition include overlapping shop information, the overlapping shop information is placed apart from each other at the predetermined distance. Thus, it is possible to provide the server, the information provision method, and the information provision program that can provide appropriate information that is highly visible to a user.

Figure 2:
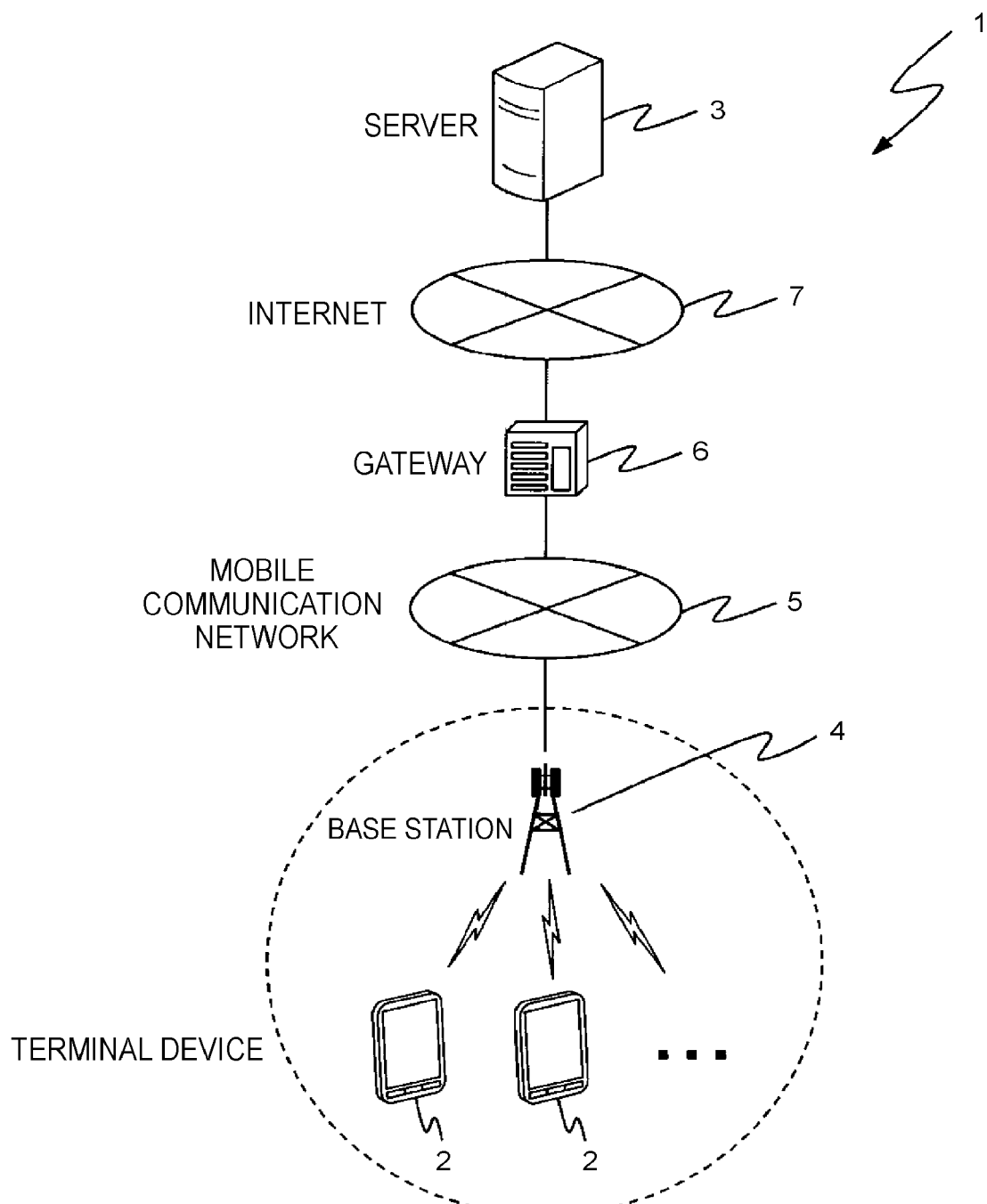
FIG. 2 shows an example of a schematic configuration of the information provision system 1.

FIG. 2 shows an example of a schematic configuration of the information provision system 1.

The information provision system 1 includes a plurality of the terminal devices 2 and the server 3. Each terminal device 2 and the server 3 are connected to each other via a communication network. For example, each terminal device 2 and the server 3 are connected to each other via a base station 4, a mobile communication network 5, a gateway 6, and the Internet 7. Each terminal device 2 is a mobile terminal owned by a user who uses a shop such as an eating/drinking place or a venue such as an event venue.

A program (for example, a search program) executed by the server 3 and a program (for example, a browser program) executed by each terminal device 2 communicate with each other by using a communication protocol such as Hypertext Transfer Protocol (HTTP).

Figure 3:
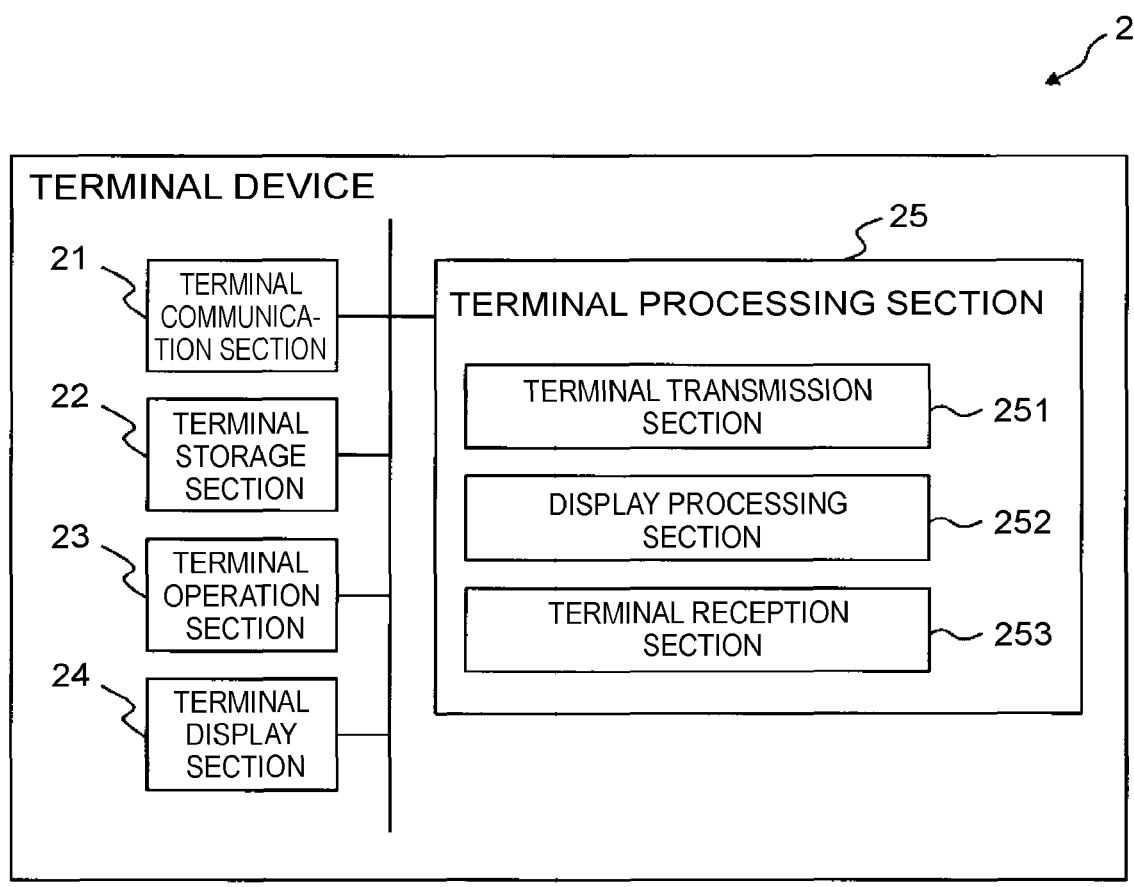
FIG. 3 shows an example of a schematic configuration of a terminal device 2.

FIG. 3 shows an example of a schematic configuration of one of the terminal devices 2

The terminal device 2 connects to the server 3 via the base station 4, the mobile communication network 5, the gateway 6, and the Internet 7 and communicates with the server 3. The terminal device 2 sends a search instruction to the server 3 as a request, according to an operation of a terminal operation section 23 (a button or the like) carried out by the user. The terminal device 2 receives display data related to a search result screen or the like from the server 3 and displays the display data. Thus, the terminal device 2 includes a terminal communication section 21, a terminal storage section 22, the terminal operation section 23, a terminal display section 24, and a terminal processing section 25.

Note that although the terminal device 2 is assumed to be a multi-functional mobile phone (so-called "smartphone") in the present embodiment, the invention is not limited to a multi-functional mobile phone. The terminal device 2 may be any device as long as the invention can be applied, and may be, for example, a mobile phone (so-called "feature phone"), a personal digital assistant (PDA), a handheld game console, a portable music player, a tablet terminal, a tablet PC (Personal Computer), a notebook PC, or the like. The terminal device 2 may also be a menu terminal or the like, which is provided in plural numbers at an eating/drinking place and with which customers at the eating/drinking place make menu orders.

The terminal communication section 21 includes a communication interface circuit including an antenna that has a predetermined frequency bandwidth as a receiving bandwidth, and connects the terminal device 2 to a wireless communication network. The terminal communication section 21 establishes a wireless signal link based on the CDMA (Code Division Multiple Access) scheme or the like with the base station 4 through a channel assigned by the base station 4, and communicates with the base station 4. The terminal communication section 21 transmits data supplied from the terminal processing section 25 to the server 3 and the like. The terminal communication section 21 supplies data received from the server 3 and the like to the terminal processing section 25.

The terminal storage section 22 includes, for example, a semiconductor memory. The terminal storage section 22 stores an operating system program, a driver program, an application program, data, and the like used for processing by the terminal processing section 25. For example, the terminal storage section 22 stores, as the driver program, an input device driver program that controls the terminal operation section 23, an output device driver program that controls the terminal display section 24, and the like. Moreover, the terminal storage section 22 stores, as the application program, a program that acquires and displays display data related to menu information or the like, and the like. The terminal storage section 22 may also temporarily store transient data related to predetermined processing.

The terminal operation section 23 may be any device with which the terminal device 2 can be operated. For example, the terminal operation section 23 is a touch panel, a key button, or the like. The user can enter characters, numbers, signs, and the like by using the terminal operation section 23. When an operation of the terminal operation section 23 is carried out by the user, the terminal operation section 23 generates a signal corresponding to the operation. The generated signal is supplied to the terminal processing section 25, as an instruction from the user.

The terminal display section 24 may also be any device as long as the device is capable of displaying a video, an image, and the like. For example, the terminal display section 24 is a liquid crystal display, an organic EL (Electro-Luminescence) display, or the like. The terminal display section 24 displays a video corresponding to video data, an image corresponding to image data, or the like supplied from the terminal processing section 25.

The terminal processing section 25 includes one or more processors and one or more respective peripheral circuits. The terminal processing section 25 performs overall control of overall operations of the terminal device 2 and is, for example, a CPU (Central Processing Unit). The terminal processing section 25 controls operations of the terminal communication section 21, the terminal display section 24, and the like so that various types of processing in the terminal device 2 are performed through appropriate procedures based on the programs stored in the terminal storage section 22, on operations of the terminal operation section 23, and the like. The terminal processing section 25 performs processing based on the programs (operating system program, driver program, application program, and the like) stored in the terminal storage section 22. The terminal processing section 25 can execute a plurality of programs (application programs and the like) in parallel.

The terminal processing section 25 includes a terminal transmission section 251, a display processing section 252, and a terminal reception section 253. Each of the sections included in the terminal processing section 25 is a function module that is implemented by a program executed by the processor included in the terminal processing section 25. Alternatively, each of the sections included in the terminal processing section 25 may be implemented on the terminal device 2 as firmware.

The terminal transmission section 251 transmits a search instruction to the server 3 via the terminal communication section 21, in response to an instruction from the user. The display processing section 252 acquires and displays display data for displaying various screens such as a screen for transmitting the search instruction and a search result screen. The display processing section 252 creates drawing data based on the received display data. That is, the display processing section 252 identifies control data and content data by analyzing the received display data, lays out the identified content data based on the identified control data, and thus creates drawing data. The display processing section 252 then outputs the created drawing data to the terminal display section 24. The terminal reception section 253 receives display data for displaying the search result screen related to a result of a search responding to the search instruction, and the like from the server 3 via the terminal communication section 21.

Figure 4:
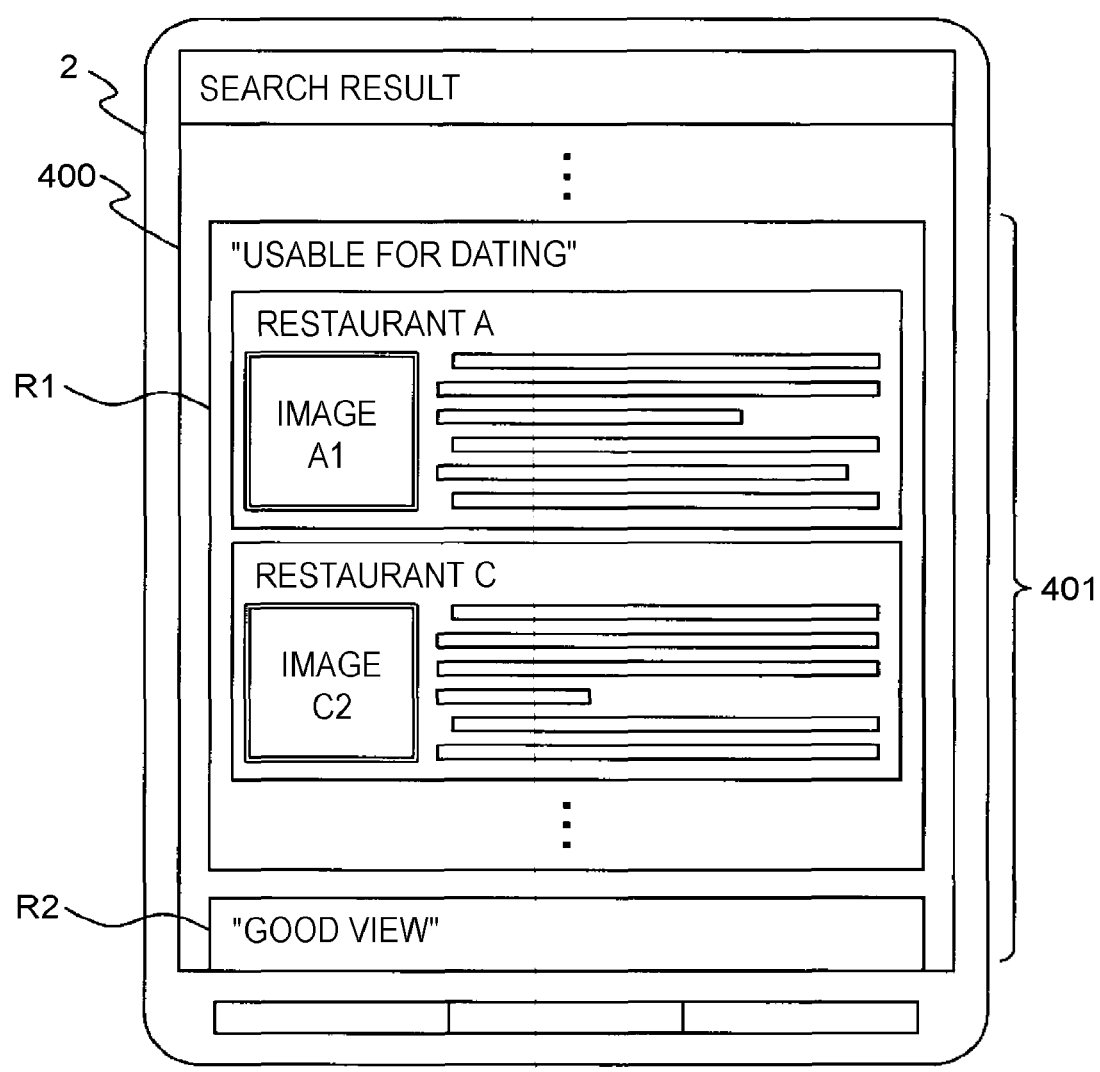
FIG. 4 shows an example of a search result screen 400 displayed by the terminal device 2.

FIG. 4 shows an example of a search result screen 400 displayed by a display function of the terminal device 2. A search result area 401 including shop information identified by the server 3 is displayed in the search result screen 400. Note that in the example shown in FIG. 4, a shop name, shop image information, an address or explanation text, and the like are displayed as shop information contained in the search result area 401. Note that various type of information such as the shop name, the shop image information, and the address or explanation text included in the shop information are examples of individual shop information.

The display area R, which is set for each search condition used to identify each shop information, is displayed in the search result area 401, and the displayed display area R includes shop information associated with a search condition corresponding to the display area R. For example, in the example shown in FIG. 4, the shop information on "restaurant A" and the shop information on "restaurant C" associated with the search condition "usable for dating" corresponding to the display area R1 is displayed in the display area R1. Note that shop information associated with the search condition "good view" corresponding to the display area R2 is displayed in the display area R2.

Figure 5:
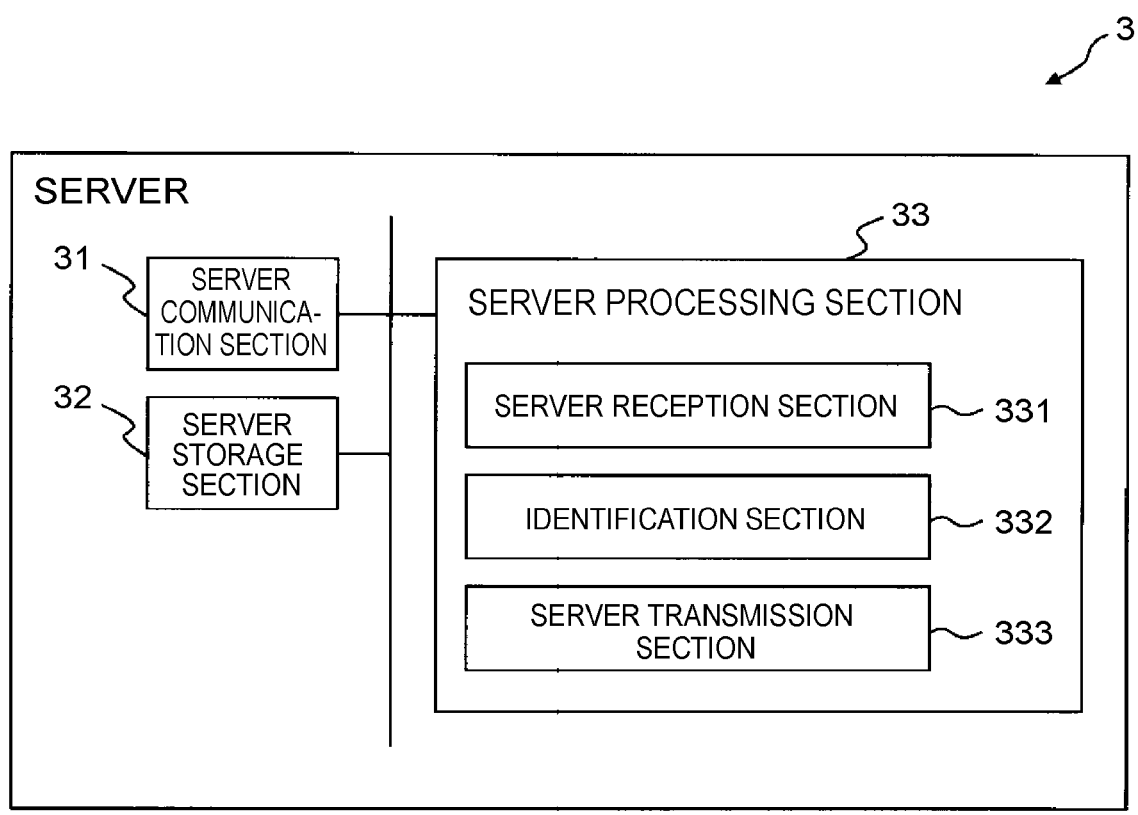
FIG. 5 shows an example of a schematic configuration of a server 3.

FIG. 5 shows an example of a schematic configuration of the server 3.

The server 3 stores a plurality of pieces of shop information associated with search conditions, and stores predetermined search conditions and related search conditions in association with each other. The server 3 stores image information associated with the search conditions, for each of the plurality of pieces of shop information. The server 3 receives a search condition transmitted from the terminal device 2 and transmits shop information associated with the received search condition to the terminal device 2. To implement functions as described above, the server 3 includes a server communication section 31, a server storage section 32, and a server processing section 33.

The server communication section 31 includes a communication interface circuit for connecting the server 3 to the Internet 7. The server communication section 31 supplies data received from any of the terminal devices 2 or the like to the server processing section 33. The server communication section 31 transmits data supplied from the server processing section 33 to any of the terminal devices 2 or the like.

The server storage section 32 includes, for example, at least one of a semiconductor memory, a magnetic disk device, and an optical disk device. The server storage section 32 stores a driver program, an operating system program, an application program, data, and the like used for processing by the server processing section 33. For example, the server storage section 32 stores, as the driver program, a communication device driver program that controls the server communication section 31, and the like. The various programs may be installed in the server storage section 32, for example, from a computer-readable detachable storage medium such as a CD-ROM or a DVD-ROM by using a publicly known setup program or the like. The server storage section 32 stores, as the data, a search condition table and a shop information table, which will be described later, as well as image information and the like. Further, the server storage section 32 may temporarily store transient data related to predetermined processing.

Note that a table in the present embodiment is an example of database formats, and the data may be stored in the form of being pooled within the server.

The server processing section 33 includes one or more processors and one or more respective peripheral circuits. The server processing section 33 performs overall control of overall operations of the server 3 and is, for example, a CPU. The server processing section 33 controls operations of the server communication section 31 and the like so that various types of processing in the server 3 are performed through appropriate procedures based on the programs stored in the server storage section 32, and the like. The server processing section 33 performs processing based on the programs (operating system program, driver program, application program, and the like) stored in the server storage section 32.

The server processing section 33 can execute a plurality of programs (application programs and the like) in parallel.

The server processing section 33 includes a server reception section 331, an identification section 332, and a server transmission section 333. Each of the sections included in the server processing section 33 is a function module implemented by a program executed on the processor included in the server processing section 33. Alternatively, each of the sections included in the server processing section 33 may be implemented on the server 3 as an independent integrated circuit, a microprocessor, or firmware.

FIGS. 6 and 7 show examples of data structures of the various tables, respectively. Note that one or more other apparatuses (a data base apparatus or the like) different from the server 3 may store all or part of the various tables described below, without the server storage section 32 storing all or part of the various tables. In this case, when the server 3 uses the information stored in the various tables, the server 3 accesses the other apparatus that stores a target table and acquires information stored in the target table. The information included in each table may be stored in a form other than the form of a table. For example, each piece of the information may be stored independently of each other.

FIG. 6 shows the search condition table. In the search condition table, search condition ID (Identification), search condition content, related search condition ID, priority, and the like are stored in association with each other, for each search condition. The search condition ID is identification information for identifying each search condition.

Under the search condition content, text information such as a key word or a sentence for searching for shop information is stored. The text information stored for a search condition in the search condition table is registered by an operator that operates the server 3 of the information provision system 1.

Under the related search condition ID, one or more respective search condition IDs of one or more search conditions, which are set as related search conditions for each search condition content, are stored. Note that, when a related search condition ID is not set, for example, as shown at "Italian" (search condition ID "KS00021") in FIG. 6, information indicating that no related search condition is associated is stored. Note that a search condition content with which one or more related search conditions are associated is a predetermined search condition.

The search priority is information indicating a priority used when search for shop information is performed in response to a search instruction. For example, the search priority is represented by numerical values of 1 to 20, and in the present example, search is performed in order starting from priority 1. The search priority may be numerical values preset by the operator that operates the server 3 of the information provision system 1, or may be numerical values automatically set based on a search history of the user.

FIG. 7 shows the shop information table. In the shop information table, shop ID, shop name, search condition, image, address, nearest station, priority, and the like are stored in association with each other, for each shop.

The shop ID is identification information for identifying each shop. The search condition is text information such as a key word or a sentence for searching for shop information on each shop. Note that the text information stored under the search condition in the shop information table is registered by the operator that operates the server 3 of the information provision system 1, a manager that runs each shop and is under contract with the operator, or the like.

Under the image, shop image information and the search condition ID of a search condition associated with the image information are stored in association with each other. Note that shop image information included in shop information to be displayed in the search result screen 400 is the image information associated with the search condition ID of a search condition used to identify the shop information.

Figure 8:
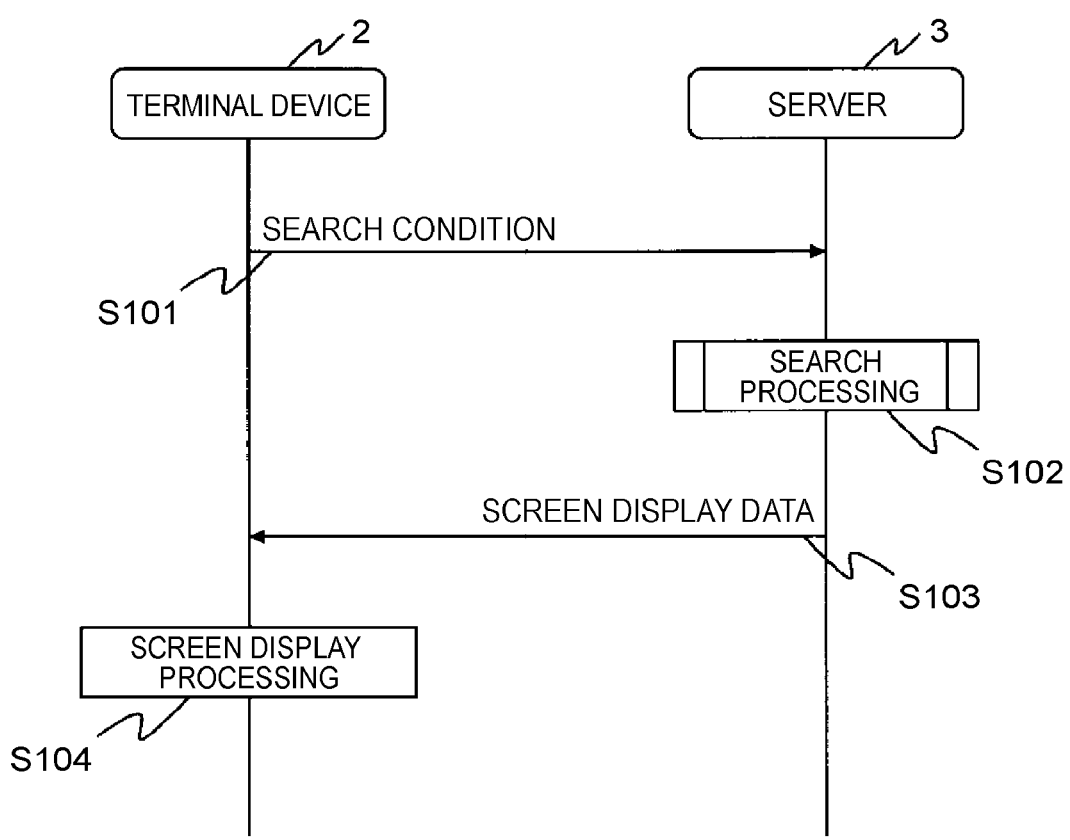
FIG. 8 shows an example of an operation sequence in the information provision system 1.

FIG. 8 shows an example of an operation sequence in the information provision system 1. The operation sequence is performed mainly by the terminal processing section 25 and the server processing section 33 in coordination with each element of the terminal device 2 and each element of the server 3, based on the programs stored beforehand in the terminal storage section 22 and the server storage section 32.

First, the display processing section 252 of the terminal device 2 displays a search instruction transmission screen (not shown), which includes a text box for allowing a search condition to be entered thereto with free words, on the terminal display section 24 in response to an operation of the terminal operation section 23 carried out by the user. Note that in place of the text box to enter a search condition, check boxes to select and enter a search condition, or the like may be displayed in the search instruction transmission screen.

Next, the display processing section 252 acquires the search condition entered in the search instruction transmission screen through the operation of the terminal operation section 23 carried out by the user. Note that if the search condition is entered with free words by using the text box, text information is acquired as the search condition, and if the search condition is selected and entered by using the check boxes or the like, a search condition ID is acquired as the search condition. Next, in response to an operation of the terminal operation section 23 carried out by the user, the terminal transmission section 251 transmits a search instruction, along with the acquired search condition and terminal identification information on the terminal device 2, to the server 3 via the terminal communication section 21 (step S101).

Next, the server reception section 331 of the server 3 receives the search instruction transmitted from the terminal device 2, along with the search condition and the terminal identification information, via the server communication section 31. Upon receiving the search instruction, the server reception section 331 instructs the identification section 332 to perform search processing and passes the search condition received along with the search instruction to the identification section 332.

Upon being instructed to perform search processing and receiving the search condition from the server reception section 331, the identification section 332 performs the search processing (step S102). Details of the search processing will be described later.

Next, the server transmission section 333 of the server 3, via the server communication section 31, transmits display data for displaying the search result screen 400 created through the search processing to the terminal device 2 that corresponds to the terminal identification information received along with the search instruction (step S103).

Next, the terminal reception section 253 of the terminal device 2, via the terminal communication section 21, receives the display data transmitted from the server 3. Upon receiving the display data, the terminal reception section 253 instructs the display processing section 252 to perform processing of displaying the search result screen 400 based on the received display data. Upon being instructed to perform display processing by the terminal reception section 253, the display processing section 252 performs screen display processing of displaying the search result screen 400 based on the received display data (step S104). Thus, the operation sequence in the information provision system 1 is completed.

Figure 9:
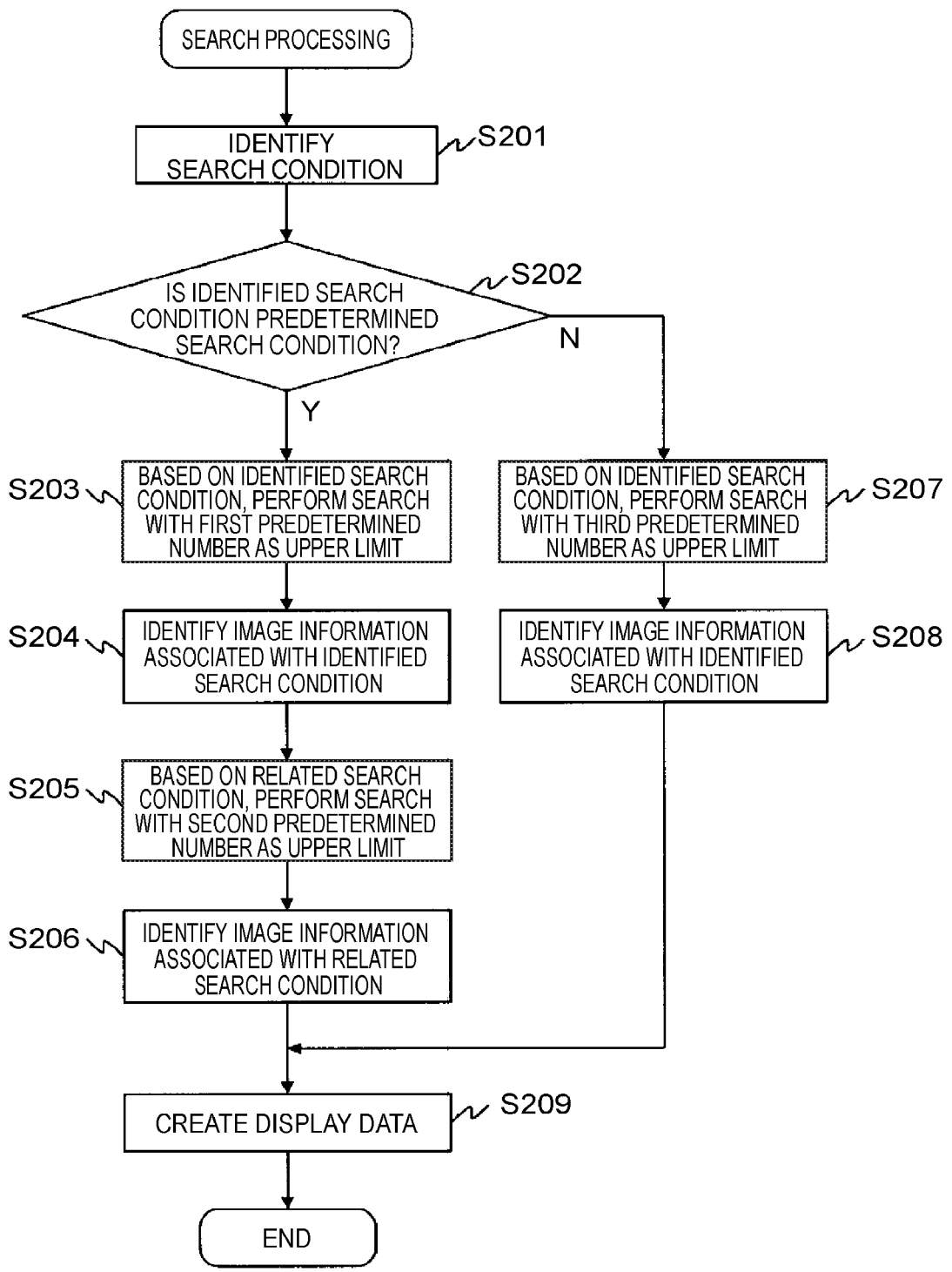
FIG. 9 shows an example of an operation flow of search processing.

FIG. 9 is a flowchart showing an example of the search processing. The search processing shown in FIG. 9 is performed at step S102 in FIG. 8.

First, the identification section 332 identifies the search condition received from the server reception section 331 (step S201). Hereinafter, processing of identifying the search condition will be described. First, the identification section 332 determines whether the search condition received from the server reception section 331 is text information or is a search condition ID. If the search condition received from the server reception section 331 is text information, the identification section 332 refers to the search condition contents stored in the search condition table and retrieves a search condition content corresponding to the text information. Next, the identification section 332 identifies a search condition ID associated with the retrieved search condition content. Note that for search for a search condition content associated with the text information, a method of searching for a search condition content that includes the text information may be used, or a method of searching for a search condition content may be used in which search for a word obtained by morphological analysis of the text information is performed. If the search condition received from the server reception section 331 is a search condition ID, the identification section 332 identifies the search condition ID received as the search condition. Thus, the processing of identifying the search condition is completed.

Next, the identification section 332 determines whether or not the search condition identified in step S201 is a predetermined search condition (step S202). That is, the identification section 332 determines whether or not the identified search condition ID is the search condition ID of a predetermined search condition that is stored in the search condition table in association with one or more related search conditions.

If the identification section 332 determines that the identified search condition is a predetermined search condition (step S202—Yes), the identification section 332 refers to the search condition table and identifies a related search condition ID that is assigned priority ("search priority" in the example) 1 (that is, the highest priority) associated with the identified search condition ID. The identification section 332 then refers to the shop information table and identifies shop IDs associated with the identified related search condition ID, with the first predetermined number as an upper limit (step S203). Note that the first predetermined number is preset and can be set appropriately in a variable manner.

Next, the identification section 332 refers to the images stored in the shop information table and, for each of the shop IDs identified in step S203, identifies image information associated with the identified search condition among pieces of image information associated with the shop ID (step S204).

Next, the identification section 332 refers to the search condition table and identifies a related search condition ID that is assigned priority ("search priority" in the example) 2 (that is, the second highest priority after priority 1) associated with the identified search condition ID. The identification section 332 then refers to the shop information table and identifies shop IDs associated with the identified related search condition ID, with the second predetermined number as an upper limit (step S205). Note that the second predetermined number is preset and can be set appropriately in a variable manner.

Next, the identification section 332 refers to the images stored in the shop information table and, for each of the shop IDs identified in step S205, identifies image information associated with the identified related search condition among pieces of image information associated with the shop ID (step S206).

Next, the identification section 332 creates display data for displaying the search result screen 400 based on the identified various types of information (step S209) and thus completes a series of the steps. Hereinafter, processing of creating the display data will be described. First, the identification section 332 refers to the shop information table and, for each of the shop IDs identified in step S203, extracts a shop name, an address, and/or a nearest station associated with the shop ID. Next, the identification section 332 identifies the extracted shop name, address, and/or nearest station associated with each shop ID and the image information associated with each shop ID identified in step S204, as shop information associated with the predetermined search condition.

Next, the identification section 332 refers to the shop information table and, for each of the shop IDs identified in step S205, extracts a shop name, an address, and/or a nearest station associated with the shop ID. Next, the identification section 332 identifies the extracted shop name, address, and/or nearest station associated with each shop ID and the image information associated with each shop ID identified in step S206, as shop information associated with the related search condition.

Next, the identification section 332 creates the display data for displaying the search result screen 400 in which the display area R1 containing the shop information associated with the predetermined search condition and the display area R2 containing the shop information associated with the related search condition are displayed. Note that if the shop information associated with the predetermined search condition and the shop information associated with the related search condition include overlapping shop information, the identification section 332 places the overlapping shop information apart from each other at the predetermined distance. Note that the predetermined search condition is an example of the first search condition and the related search condition is an example of the second search condition. Thus, the processing of creating the display data is completed.

If the identification section 332 determines that the identified search condition is not a predetermined search condition (step S202—No), the identification section 332 refers to the shop information table and identifies shop IDs associated with the identified search condition, with the third predetermined number as an upper limit (step S207). Note that the third predetermined number is preset and can be set appropriately in a variable manner. If the identified pieces of shop information are more than the first to third predetermined numbers, respectively, the identification section 332 may identify shop information to be displayed in the search result screen 400 so that the number of pieces of the shop information is smaller than the first to third predetermined numbers, respectively. In identifying shop information, shop information may be identified at random, or may be identified according to a browsing history of the user, in such a manner that the number of pieces of the shop information is smaller than the first to third predetermined numbers, respectively.

Next, the identification section 332 refers to the images stored in the shop information table and, for each of the shop IDs identified in step S207, identifies image information associated with the identified search condition among pieces of image information associated with the shop ID (step S208).

Next, the identification section 332 creates display data for displaying the search result screen 400 based on the identified various types of information (step S209) and thus completes a series of the steps.

As described in detail above, in the information provision system 1, if shop information associated with the first search condition and shop information associated with the second search condition include overlapping shop information, the overlapping shop information is placed apart from each other at the predetermined distance. Thus, it is possible to provide the server, the information provision method, and the information provision program that can provide appropriate information that is highly visible to a user.

Note that the terminal device 2 is not limited to the communication device that communicates with the server 3 via the mobile communication network 5, and may be an information terminal, such as a stationary personal computer (PC), that communicates with the server 3 via an access point (not shown), a router (not shown), and the Internet.

Figure 10:
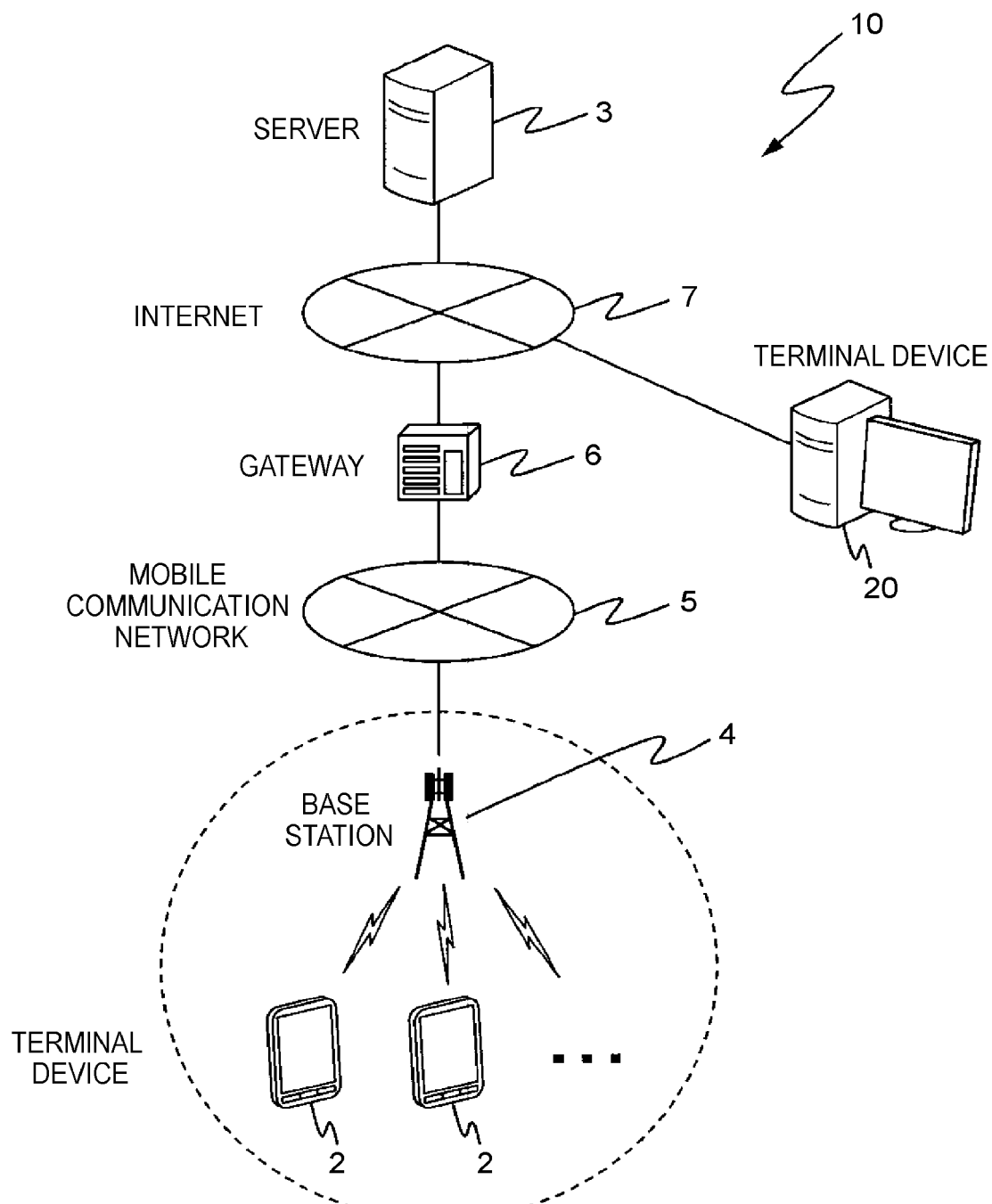
FIG. 10 shows another example of a schematic configuration of an information provision system 10.

FIG. 10 shows another example of a schematic configuration of an information provision system 10. Note that in FIG. 10, the same components as the components of the information provision system 1 shown in FIG. 2 are denoted by the same reference signs in FIG. 2, and a description of the same components is omitted.

The information provision system 10 includes a plurality of terminal devices 2, 20 and a server 3. The terminal device 20 is, for example, an information terminal such as a stationary personal computer (PC). The terminal device 20 and the server 3 are connected to each other via the Internet 7. A program (for example, a search program) executed by the server 3 and a program (for example, a browser program) executed by the terminal device 20 communicate with each other by using a communication protocol such as Hypertext Transfer Protocol (HTTP).

The server 3 creates display data for displaying a search result screen 400 containing shop information to be transmitted to the terminal device 2 and display data for displaying a search result screen 400 containing shop information to be transmitted to the terminal device 20 in such a manner that a display form of the shop information to be transmitted to the terminal device 2 and a display form of the shop information to be transmitted to the terminal device 20 are different from each other. Note that the display form refers to the shape, size, display color, and amount of the display content of a display area R, the sizes of a shop name, shop image information, an address or explanation text, and the like displayed as shop information, a display layout within the display area R, or the like. Note that in addition to the display forms of the shop information and/or in place of the display forms of the shop information, control may be performed by the terminal device 2, 20 so that different smells or sounds are generated when the shop information is displayed or operated. Note that the sounds refer to display sounds, operation sounds, or the like. Thus, it is possible to provide appropriate information that is highly visible to each user owning the terminal device 2, 20.

The server storage section 32 may store a search condition table for handling a search instruction from the terminal device 2 and a search condition table for handling a search instruction from the terminal device 20 individually. In this case, related search condition IDs associated with the same search condition IDs may be different between the search condition table for handling a search instruction from the terminal device 2 and the search condition table for handling a search instruction from the terminal device 20. The server storage section 32 stores the search condition tables corresponding to types of the terminal device 2, 20 in this manner, whereby even if the terminal device 2, 20 transmits a search instruction related to the same predetermined search condition to the server 3, a result of a search based on a related search condition differs with the type of the terminal device 2, 20. Thus, it is possible to provide appropriate information that is highly visible to each user owning the terminal device 2, 20.

The server storage section 32 may store a plurality of search condition tables according to area information. That is, if the terminal device 2 enters area information about the location of a shop along with a predetermined search condition as search conditions, the identification section 332 of the server 3, based on the area information included in the search conditions received from the terminal device 2, extracts a search condition table corresponding to the area information stored in the server storage section 32, refers to the extracted search condition table, and performs search processing based on the predetermined search condition. Thus, it is possible to provide appropriate information that is highly visible, according to an area or a place a user wants to use. Note that in place of entering area information about the location of a shop, the terminal device 2 may automatically input area information according to a self-location, which is acquired by a GPS (Global Positioning System) receiver or the like included in the terminal device 2.

Priorities each associated with a search condition ID may be stored in the search condition table. In this case, the identification section 332 of the server 3, in step S203, identifies shop TDs associated with the identified search condition in descending order of priorities associated with other search conditions associated with the shops ID than the identified search condition, with the first predetermined number as an upper limit. Moreover, in this case, the identification section 332, in step S205, identifies shop IDs associated with the identified related search condition in descending order of priorities associated with other search conditions associated with the shop IDs than the identified search condition, with the second predetermined number as an upper limit. Furthermore, in this case, the identification section 332, in step S207, identifies shop IDs associated with the identified search condition in descending order of priorities associated with other search conditions than the identified search condition, with the third predetermined number as an upper limit. In this manner, each shop is displayed based on a priority associated with another search condition of the shop. Accordingly, it is possible to provide a user with appropriate information that is highly visible, according to an atmosphere, a genre, and the like of each shop.

In step S203, the identification section 332 may calculate the total number of shop IDs associated with the identified search condition and, if the calculated total number of shop IDs is equal to or larger than the third predetermined number, may set the first predetermined number that is smaller than the third predetermined number. If the calculated total number of shop IDs is smaller than the first predetermined number, the identification section 332 may set the second predetermined number to a number corresponding to the difference between the third predetermined number and the calculated total number of shop IDs, without setting the first predetermined number.

In step S205, if a plurality of related search conditions are associated with the identified search condition, the identification section 332 may identify shop IDs in descending order of respective search priorities associated with the identified plurality of related search conditions. Note that the shop IDs are identified in such a manner that the total number of the shop IDs associated respectively with the identified plurality of related search conditions does not exceed the second predetermined number. In this case, the identification section 332 may retrieve shop information based on a related search condition assigned a next higher search priority only if the number of pieces of shop information identified based on a related search condition assigned the highest search priority is smaller than a predetermined threshold.

In this case, in step S206, the identification section 332 identifies, for each of the identified shop IDs, image information associated with each of the identified plurality of related search conditions, among pieces of image information associated with the shop ID. Then in step S209, the identification section 332 refers to the shop information table, extracts, for each of the shop IDs identified in step S205, a shop name, an address, and/or a nearest station associated with the shop ID, and further identifies the extracted shop name, address, and/or nearest station associated with each shop ID and the image information associated with each shop ID identified in step S206, as shop information associated with each of the plurality of related search conditions. The identification section 332 then creates display data for displaying the search result screen 400 in which the display area R1 containing the shop information associated with the predetermined search condition and a plurality of the display areas R2 containing the respective shop information associated with the plurality of related search conditions, respectively, are displayed. In this manner, shop information retrieved based on each related search condition is displayed in each display area R2 that corresponds to each related search condition used in search processing, whereby it is possible to provide appropriate information that is highly visible to each user.

In step S202, if a plurality of search conditions are identified, the identification section 332 does not need to perform search using a related search condition. Hereinafter, search processing in a case where two search conditions are identified will be described. Note that one of the two search conditions will be referred to as a first search condition, and the other will be referred to as a second search condition.

The identification section 332 refers to the shop information table and identifies shop IDs associated with the first search condition of the two identified search conditions in descending order of priorities, with the first predetermined number as an upper limit. Next, the identification section 332 refers to the images stored in the shop information table and identifies, for each of the identified shop IDs, image information associated with the identified search conditions, among pieces of image information associated with the shop ID. Note that if individual shop information (explanation text or the like) associated with the search conditions is stored in addition to the image information, the identification section 332 identifies individual shop information associated with the identified search conditions, among pieces of individual shop information associated with each shop ID.

Next, the identification section 332 refers to the shop information table and identifies shop IDs associated with the second search condition of the two identified search conditions in descending order of priorities, with the second predetermined number as an upper limit. Next, the identification section 332 refers to the images stored in the shop information table and identifies, for each of the identified shop IDs, image information associated with the identified second search condition, among pieces of image information associated with the shop ID. Note that if individual shop information (explanation text or the like) associated with the search conditions is stored in addition to the image information, the identification section 332 identifies individual shop information associated with the identified search conditions, among pieces of individual shop information associated with each shop ID.

Next, the identification section 332 creates display data for displaying the search result screen 400 based on the identified various type of information. Hereinafter, processing of creating the display data will be described.

First, the identification section 332 refers to the shop information table and extracts, for each of the identified shop IDs, a shop name, an address, and/or a nearest station associated with the shop ID. Next, the identification section 332 identifies the extracted shop name, address, and/or nearest station associated with each shop ID and image information associated with each of the identified shop ID, as shop information associated with the predetermined search conditions. Note that if individual shop information such as explanation text is identified in addition to the image information or in place of the image information, the individual shop information such as explanation text is also identified as shop information associated with the predetermined search conditions.

Next, the identification section 332 creates display data for displaying the search result screen 400 in which the display area R1 containing the shop information associated with the first search condition and the display area R2 containing the shop information associated with the second search condition are displayed. Note that if the shop information associated with the first search condition and the shop information associated with the second search condition include overlapping shop information, the identification section 332 places the overlapping shop information apart from each other at the predetermined distance. Thus, the processing of creating the display data is completed. Hence, it is possible to provide the server, the information provision method, and the information provision program that can provide appropriate information that is highly visible to a user. Note that if three or more search conditions are identified, search processing is also performed as described above. In this case, if respective shop information associated with the three or more search conditions include overlapping shop information (if three or more pieces of the same shop information are retrieved), the overlapping shop information may be placed within a scope not exceeding the upper-limit number of overlaps (for example, two).

In processing of placing the overlapping shop information apart from each other at the predetermined distance, the identification section 332 may set the predetermined distance to be longer as individual shop information included in each of the overlapping shop information matches each other to a higher degree of matching. For example, if the same shop information is included in the shop information associated with the first search condition and in the shop information associated with the second search condition, the identification section 332, with respect to the same shop information, sets the longer predetermined distance in a case where an image of the shop information associated with the first search condition matches an image of the shop information associated with the second search condition, than the predetermined distance in a case where the image of the shop information associated with the first search condition does not match the image of the shop information associated with the second search condition. Moreover, with respect to the same shop information, the identification section 332 compares the number of matching pieces of individual shop information in the shop information associated with the first search condition and in the shop information associated with the second search condition with a predetermined value and, if the number of the matching pieces of individual shop information is equal to or larger than the predetermined value, placement with predetermined distance separation is performed.

In the processing of placing the overlapping shop information apart from each other at the predetermined distance, the identification section 332 may set the predetermined distance to be longer as the display area R1 that displays the shop information associated with the first search condition matches the display area R2 that displays the shop information associated with the second search condition to a higher degree of matching. For example, a higher degree of matching is set as the number of pieces of the shop information included in the display area R1 and the number of pieces of the shop information included in the display area R2 are closer to each other. For example, a higher degree of matching is set as the place or area of the shop information included in the display area R1 and the place or area of the shop information included in the display area R2 are closer to each other. For example, a higher degree of matching is set when the genre of the shop information included in the display area R1 and the genre of the shop information included in the display area R2 have the same parent genre.

In the processing of placing the overlapping shop information apart from each other at the predetermined distance, the identification section 332 may set the predetermined distance, depending on the size of the display area R1 that displays the shop information associated with the first search condition and/or the size of the display area R2 that displays the shop information associated with the second search condition. For example, the identification section 332 sets the predetermined distance to be shorter as the display area R1 that displays the shop information associated with the first search condition and/or the display area R2 that displays the shop information associated with the second search condition has a larger size.

Moreover, if the shop information associated with the first search condition and the shop information associated with the second search condition include overlapping shop information, the identification section 332 may make the respective display forms of the overlapping shop information different from each other. Hereinafter, of the overlapping shop information, the shop information associated with the first search condition will be referred to as first overlapping shop information, and the shop information associated with the second search condition will be referred to as second overlapping shop information. For example, image information included in the shop information associated with the first search condition and image information included in the shop information associated with the second search condition are different from each other. With respect to individual shop information other than the image information, the identification section 332 may also set the individual shop information included in the first overlapping shop information to be different from part or all of the individual shop information included in the second overlapping shop information. For example, the identification section 332 may set the information amount of the individual shop information included in the first overlapping shop information to be different from the information amount of the individual shop information included in the second overlapping shop information. For example, the identification section 332 may set at least one of the shape, size, display color, amount of the display content of the display area R containing the first overlapping shop information to be different from at least one of the shape, size, display color, amount of the display content of the display area R containing the second overlapping shop information.

The information provision system 1 may be configured to include only the terminal devices 2. In this case, each terminal device 2 includes each function of the server 3.

Note that information to be provided by the server 3 in the information provision system 1 is not limited to shop information. For example, the information may be venue information such as an event venue, and the like. In this case, the shop information table stores venue ID, venue name, search condition, image, address, nearest station, priority, and the like in associated with each other, for each venue. When a user owning any one of the terminal devices 2 uses the event venue or the like, processing of searching for venue information is performed by the server 3 in response to a search instruction from the user. A search condition is not limited to text information, but may be any information in various data forms that can be subjected to search processing, such as audio information and image information.

In step S202, if a plurality of search conditions are identified, the identification section 332 identifies shop information associated with all of the plurality of search conditions. For example, if a first search condition "usable for dating" and a search condition of area information "Roppongi" are identified, shop information associated with both the search condition "usable for dating" and the search condition "Roppongi" is retrieved. In this case, the server storage section 32 stores a plurality of search condition tables according to area information, that is, the server storage section 32 further stores a search condition table associated with the area information "Roppongi". Note that in the search result screen 400, a display area R3 containing shop information associated with the search condition of the area information "Roppongi" and a display area R4 containing shop information associated with a related search condition retrieved from the further stored search condition table associated with the area information "Roppongi" may be displayed, in addition to the display area R1 containing shop information associated with the first search condition "usable for dating" and the display area R2 containing shop information associated with a related search condition.

If three or more search conditions are identified and/or three or more related search conditions associated with the identified search conditions are identified, the identification section 332 may create display data for displaying a screen in which only shop information retrieved based on a specified one or more of the related search conditions is displayed, with overlapping allowed. For example, if a predetermined search condition "usable for dating", a related search condition "National Highway No. 319", and a related search condition "Roppongi Hills" are associated with a shop A, only shop information retrieved based on a related search condition indicating an inside of a commercial venue is displayed, with overlapping allowed. That is, the shop A is displayed in the display area R1 containing shop information associated with the predetermined search condition "usable for dating" and in the display area R3 containing shop information associated with the related search condition "Roppongi Hills", but the shop A is not displayed in the display area R4 containing shop information associated with the related search condition "National Highway No. 319". In this manner, a configuration is made such that search conditions that allows overlapping information to be displayed can be set, whereby more minute display of shop information can be achieved. Accordingly, it is possible to provide appropriate information that is highly visible to each user.

In the information provision system, information transmitted from the server 3 to the terminal devices 2 is not limited to shop information. For example, the server 3 may store various types of information, such as accommodation, air ticket, cuisine, advertisement, service, and product (for example, air thicket, article, cuisine, advertisement, party course, wedding plan, itinerary, and the like), in association with search conditions. In this case, the server 3 identifies various types of information associated with a search condition transmitted from a terminal device 2 and transmits the identified information to the terminal device 2.

It should be understood that those ordinarily skilled in the art can make various changes, substitutions, and modifications, without departing from the spirit and scope of the invention.

REFERENCE SIGNS LIST 1, 10 Information provision system
2, 20 Terminal device
21 Terminal communication section
22 Terminal storage section
23 Terminal operation section
24 Terminal display section
25 Terminal processing section
251 Terminal transmission section
252 Display processing section
253 Terminal reception section
3 Server
31 Server communication section
32 Server storage section
33 Server processing section
331 Server reception section
332 Identification section
333 Server transmission section
4 Base station
5 Mobile communication network
6 Gateway
7 Internet

The invention claimed is:

1. A server that provides information to a terminal device, comprising:
a memory configured to store a plurality of pieces of display information associated with search conditions; and
processing circuitry configured to:
identify any of the search conditions and identify the display information associated with the identified search condition; and
transmit display data for displaying a screen containing the identified display information to the terminal device, wherein
if a first search condition and a second search condition are identified, the display information associated with the first search condition and the display information associated with the second search condition are identified, and
if the display information associated with the first search condition and the display information associated with the second search condition include overlapping display information, the display data for displaying the screen in which the overlapping display information is placed apart from each other at a predetermined distance is transmitted, and
the predetermined distance is set to be longer
as a display area that displays the display information associated with the first search condition and a display area that displays the display information associated with the second search condition match each other to a higher degree of matching, or
as individual display information included in each of the overlapping display information matches each other to a higher degree of matching.

2. The server according to claim 1, wherein
the processing circuitry is further configured to create the screen containing the display information, and
the screen is created so as to include a display area that displays the display information associated with the first search condition and a display area that displays the display information associated with the second search condition.

3. The server according to claim 1, wherein
if three or more search conditions are identified, the display information associated with each of the three or more search conditions are identified, and
if the respective display information associated with the three or more search conditions include overlapping display information, the display data for displaying the screen in which the overlapping display information is placed within a scope not exceeding an upper-limit number of overlaps is transmitted.

4. The server according to claim 1, wherein the predetermined distance is set depending on the size of a display area containing the identified display information.

5. The server according to claim 4, wherein the predetermined distance is set to be shorter as the size of the display area containing the identified display information is larger.

6. A server that provides information to a terminal device, comprising:
a memory configured to store a plurality of pieces of display information associated with search conditions; and
processing circuitry configured to:
identify any of the search conditions and identify the display information associated with the identified search condition; and
transmit display data for displaying a screen containing the identified display information to the terminal device, wherein
if a first search condition and a second search condition are identified, the display information associated with the first search condition and the display information associated with the second search condition are identified, and
if the display information associated with the first search condition and the display information associated with the second search condition include overlapping display information, the display data for displaying the screen containing the display information in which respective display forms of the overlapping display information are made so as to be different from each other, and
with respect to the overlapping display information, if a degree of matching between individual display information associated with the first search condition included in the display information identified based on the first search condition and individual display information associated with the second search condition included in the display information identified base on the second search condition is equal to or higher than a predetermined value, the display data for displaying the screen in which the overlapping display information is placed from each other at a predetermined distance is transmitted.

7. The server according to claim 6, wherein
the processing circuitry is further configured to create the screen containing the display information, and
the screen is created such that the respective display forms of the overlapping display information are different from each other in such a manner that part or all of individual display information included in each of the overlapping display information is set to be different from each other.

8. The server according to claim 7, wherein the individual display information is shop image information and/or shop explanation text.

9. The server according to claim 6, wherein
with respect to individual display information included in the display information, the memory stores the individual display information associated with the first search condition and the individual display information associated with the second search condition, and
the respective display forms of the overlapping display information are made so as to be different from each other in such a manner that the display information, of the overlapping display information, identified based on the first search condition is configured to include the individual display information associated with the first search condition, and the display information, of the overlapping display information, identified based on the second search condition is configured to include the individual display information associated with the second search condition.

10. The server according to claim 9, wherein the individual display information is shop image information and/or shop explanation text.

11. The server according to claim 6, wherein
the processing circuitry is further configured to create the screen containing the display information, and
the screen is created such that the respective display forms of the overlapping display information are different from each other in such a manner that an information amount of individual display information included in each of the overlapping display information is set to be different from each other.

12. The server according to claim 11, wherein the individual display information is shop image information and/or shop explanation text.

13. The server according to claim 6, wherein
the processing circuitry is further configured to create the screen containing the display information,
the screen is created so as to include a display area that displays the display information associated with the first search condition and a display area that displays the display information associated with the second search condition, and
the screen is created such that the respective display forms of the overlapping display information are different from each other in such a manner that a plurality of the display areas containing the overlapping display information, respectively, are set to be different from each other in at least one of shape, size, display color, and amount of a display content.

14. The server according to claim 6, wherein the processing circuitry is further configured to perform control in the screen so that different smells or sounds are generated when the overlapping display information is displayed or operated.

15. An information provision method to be performed by a computer that includes a storage section and provides information to a terminal device, comprising:
storing a plurality of pieces of display information associated with search conditions in the storage section;
identifying any of the search conditions;
identifying the display information associated with the identified search condition; and
transmitting display data for displaying a screen containing the identified display information to the terminal device, wherein
if a first search condition and a second search condition are identified in the identifying any of the search conditions, the display information associated with the first search condition and the display information associated with the second search condition are identified in the identifying the display information,
in the transmitting display data, if the display information associated with the first search condition and the display information associated with the second search condition include overlapping display information, the display data for displaying the screen in which the overlapping display information is placed apart from each other at a predetermined distance is transmitted, and
the predetermined distance is set to be longer
as a display area that displays the display information associated with the first search condition and a display area that displays the display information associated with the second search condition match each other to a higher degree of matching, or
as individual display information included in each of the overlapping display information matches each other to a higher degree of matching.

16. An information provision method to be performed by a computer that includes a storage section and provides information to a terminal device, comprising:
storing a plurality of pieces of display information associated with search conditions in the storage section;
identifying any of the search conditions;
identifying the display information associated with the identified search condition; and
transmitting display data for displaying a screen containing the identified display information to the terminal device, wherein
if a first search condition and a second search condition are identified in the identifying any of the search conditions, the display information associated with the first search condition and the display information associated with the second search condition are identified in the identifying the display information,
in the transmitting display data, if the display information associated with the first search condition and the display information associated with the second search condition include overlapping display information, the display data for displaying the screen containing the display information in which respective display forms of the overlapping display information are made so as to be different from each other is transmitted, and with respect to the overlapping display information, if a degree of matching between individual display information associated with the first search condition included in the display information identified based on the first search condition and individual display information associated with the second search condition included in the display information identified based on the second search condition is equal to or higher than a predetermined value, the overlapping display information is placed from each other at a predetermined distance.

17. A storage medium that stores an information provision program of a server that includes a storage section and provides information to a terminal device, comprising causing the server to perform:

storing a plurality of pieces of display information associated with search conditions in the storage section;

identifying any of the search conditions;

identifying the display information associated with the identified search condition; and transmitting display data for displaying a screen containing the identified display information to the terminal device, wherein if a first search condition and a second search condition are identified in the identifying any of the search conditions, the display information associated with the first search condition and the display information associated with the second search condition are identified in the identifying the display information, in the transmitting display data, if the display information associated with the first search condition and the display information associated with the second search condition include overlapping display information, the display data for displaying the screen in which the overlapping display information is placed apart from each other at a predetermined distance is transmitted, and the predetermined distance is set to be longer as a display area that displays the display information associated with the first search condition and a display area that displays the display information associated with the second search condition match each other to a higher degree of matching, or as individual display information included in each of the overlapping display information matches each other to a higher degree of matching.

18. A storage medium that stores an information provision program of a server that includes a storage section and provides information to a terminal device, causing the server to perform:

storing a plurality of pieces of display information associated with search conditions in the storage section;

identifying any of the search conditions;

identifying the display information associated with the identified search condition; and transmitting display data for displaying a screen containing the identified display information to the terminal device, wherein if a first search condition and a second search condition are identified in the identifying any of the search conditions, the display information associated with the first search condition and the display information associated with the second search condition are identified in the identifying the display information, in the transmitting display data, if the display information associated with the first search condition and the display information associated with the second search condition include overlapping display information, the display data for displaying the screen containing the display information in which respective display forms of the overlapping display information are made so as to be different from each other is transmitted, and with respect to the overlapping display information, if a degree of matching between individual display information associated with the first search condition included in the display information identified based on the first search condition and individual display information associated with the second search condition included in the display information identified based on the second search condition is equal to or higher than a predetermined value, the overlapping display information is placed from each other at a predetermined distance.

* * * * *